US011615289B2

(12) United States Patent
Wilkins et al.

(10) Patent No.: US 11,615,289 B2
(45) Date of Patent: Mar. 28, 2023

(54) CONFIGURATION PRICE QUOTE WITH ENHANCED APPROVAL CONTROL

(71) Applicant: Oracle International Corporation, Redwood Shores, CA (US)

(72) Inventors: Jeffrey Wilkins, Palatine, IL (US); Re Lai, Redwood City, CA (US); Ellen Beres, Roswell, GA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1264 days.

(21) Appl. No.: 16/021,245

(22) Filed: Jun. 28, 2018

(65) Prior Publication Data
US 2020/0005123 A1    Jan. 2, 2020

(51) Int. Cl.
| G06N 3/04 | (2006.01) |
| G06Q 30/02 | (2012.01) |
| G06F 17/17 | (2006.01) |
| G06Q 30/0283 | (2023.01) |

(52) U.S. Cl.
CPC ........... *G06N 3/0454* (2013.01); *G06F 17/17* (2013.01); *G06N 3/0481* (2013.01); *G06Q 30/0283* (2013.01)

(58) Field of Classification Search
CPC .... G06Q 30/02; G06Q 30/06; G06Q 30/0283; G06Q 30/0611; G06N 3/04; G06N 3/0454; G06N 3/0481; G06F 17/17
See application file for complete search history.

(56) References Cited

U.S. PATENT DOCUMENTS

| 10,498,609 | B1 * | 12/2019 | Barbiro | H04L 41/16 |
| 10,783,575 | B1 * | 9/2020 | Krappe | G06F 21/6245 |
| 10,937,004 | B2 * | 3/2021 | Comerford | G06Q 10/1095 |
| 2005/0010539 | A1 * | 1/2005 | Zwicker | G06Q 30/06 |
| | | | | 705/400 |

(Continued)

OTHER PUBLICATIONS

Chen, Zhaoxun, and Liya Wang. "Adaptable product configuration system based on neural network." International journal of production research 47.18 (2009): 5037-5066. (Year: 2009).*

(Continued)

*Primary Examiner* — Kamran Afshar
*Assistant Examiner* — Randall K. Baldwin
(74) *Attorney, Agent, or Firm* — Potomac Law Group, PLLC

(57) ABSTRACT

Embodiments operate a configurator that generates a quote for a product or service configuration, the quote including a quote workflow that includes at least one required quote approval and the quote includes a plurality of quote attributes that define the quote. Embodiments input the plurality of quote attributes into a first neural network model and a second neural network model and generate with a gradient descent a likelihood that the quote will be approved and a time required for the quote to be approved. Embodiments generate one or more attributes with the largest gradient values for the likelihood that the quote will be approved and the time required for the quote to be approved. Embodiments receive a change to one or more of the attributes and regenerate the likelihood that the quote will be approved and/or the time required for the quote to be approved based on the change.

20 Claims, 8 Drawing Sheets

(56) References Cited

U.S. PATENT DOCUMENTS

| | | | | |
|---|---|---|---|---|
| 2011/0218827 | A1* | 9/2011 | Kenefick | G06Q 40/08 |
| | | | | 705/4 |
| 2017/0124451 | A1* | 5/2017 | Barham | G06N 3/063 |
| 2017/0286909 | A1 | 10/2017 | Baynes | |
| 2017/0337605 | A1* | 11/2017 | Codella | G06Q 30/0623 |
| 2018/0060744 | A1* | 3/2018 | Achin | G06N 5/04 |
| 2018/0285790 | A1* | 10/2018 | Huynh | G06Q 30/0206 |
| 2018/0293640 | A1* | 10/2018 | Krappé | G06Q 30/0611 |
| 2018/0349324 | A1* | 12/2018 | Krappé | G06F 16/435 |

OTHER PUBLICATIONS

Helo, Petri T., et al. "Integrated Vehicle Configuration System—Connecting the domains of mass customization." Computers in Industry 61.1 (2010): 44-52. (Year: 2010).*

Hogenboom, A., et al. "Adaptive tactical pricing in multi-agent supply chain markets using economic regimes." Decision Sciences 46.4 (2015): 791-818 (Year: 2015).*

Li, Sheng, Jaya Kawale, and Yun Fu. "Predicting user behavior in display advertising via dynamic collective matrix factorization." Proceedings of the 38th International ACM SIGIR Conference on Research and Developmentin Information Retrieval. 2015: 875-878 (Year: 2015).*

Patel, Akash. Design of an Auto-generated Quote and Engineering Method of Procedure System. Diss. Concordia University, 2016: i-98(Year: 2016).*

Adam, Matias B. Improving complex sale cycles and performance by using machine learning and predictive analytics to understand the customer journey. Diss. Massachusetts Institute of Technology, Jun. 7, 2018: 1-107 (Year: 2018).*

International Search Report and Written Opinion issued in the corresponding International Application No. PCT/US2019/036013.

Chris McCormick, "Word2Vec Tutorial—The Skip-Gram Model", Apr. 19, 2016, Retrieved from http://www.mccormickml.com on Mar. 14, 2018.

Tomas Mikolov et al., "Distributed Representations of Words and Phrases and their Compositionality", arXiv:1310.4546 [cs.CL], Oct. 16, 2013, pp. 1-9.

Oracle BigMachines CPQ eCommerce Transactions Cloud Service, Oracle, 2014.

* cited by examiner

CONFIGURATION PRICE QUOTE WITH ENHANCED APPROVAL CONTROL

FIELD

One embodiment is directed generally to a computer system, and in particular to the generation of product configurations and quotes with a computer system.

BACKGROUND INFORMATION

Configure-price-quote ("CPQ") systems, also known as sales configuration systems, allow users to create a sales quotation that can include an arbitrary number of products or services (collectivity, "products"), some of which may be configurable. Both products and services (such as complex financial instruments) may be configurable to generate both product configurations and services configurations.

Existing CPQ systems are designed for use by companies, typically manufacturers or service providers, who offer configurable products or services for sale. The systems are normally designed to be administered by agents of the same entity that manufacturers the product. Complex configurable products used in business are often sold directly from the manufacturer to the purchasing company. These types of sales may be referred to as business-to-business or B2B transactions.

CPQ systems may facilitate the process of selling complex configurable product by automating product configuration. Business rules ("configuration rules" and "pricing rules") that determine how the product is configured and priced may be encoded in the software application, and may be executed when the user creates a quote for the configured product. The business rules ensure that the product is correctly configured, that required product components are included, and that incompatible product options are preferably not selected. Pricing rules may apply complex logic like bundle discounts to the price.

Configurable products, especially those sold in B2B transactions, can be very complicated. Configuration and pricing rules that govern the configuration and pricing of a complex product can number in the thousands or even hundreds of thousands. Examples of such highly complex products include cellular network base stations, automated material handling system in a large warehouse, and long-haul semi tractors. Even comparatively simple products such as diesel generators, custom windows, and HVAC air handlers can have hundreds or thousands of business rules.

When configuring a product or service, a user such as a sales user typically requires approval before issuing a price quote for the configured product. The need for an approval typically relies on predefined rules in the CPQ system. For example, if a price discount of a configured product exceeds 20% and is less than 50%, a rule could require approval of a sales manager. If the price discount exceeds 50%, a rule could require approval of both a sales manager and a sales vice president.

SUMMARY

Embodiments operate a configurator that generates a quote for a product or service configuration, the quote including a quote workflow that includes at least one required quote approval and the quote includes a plurality of quote attributes that define the quote. Embodiments input the plurality of quote attributes into a first neural network model and a second neural network model. Embodiments generate at the first neural network model and with a gradient descent a likelihood that the quote will be approved and at the second neural network model a time required for the quote to be approved. Embodiments generate one or more attributes with the largest gradient values for the likelihood that the quote will be approved and the time required for the quote to be approved. Embodiments receive a change to one or more of the attributes and regenerate the likelihood that the quote will be approved and/or the time required for the quote to be approved based on the change.

DETAILED DESCRIPTION

One embodiment is a service or product configurator which provides guidance, using machine learning, on the workflow process required to get a configured quote approved, including recommending changes to a quote to increase the chance that a quote will get approved or how to decrease the time needed for approval.

In general, with known CPQ or configurator systems, sales users submitting quotes for approval are given no indication what is likely to happen next or how long this step is likely to take. The user is also generally blind to how likely the quote is to get approved or the expected time that it will take. Further, with known systems there generally is no guidance to recommend anything else that the user could do to make an approval more likely or to decrease the time to approve.

Figure 1:
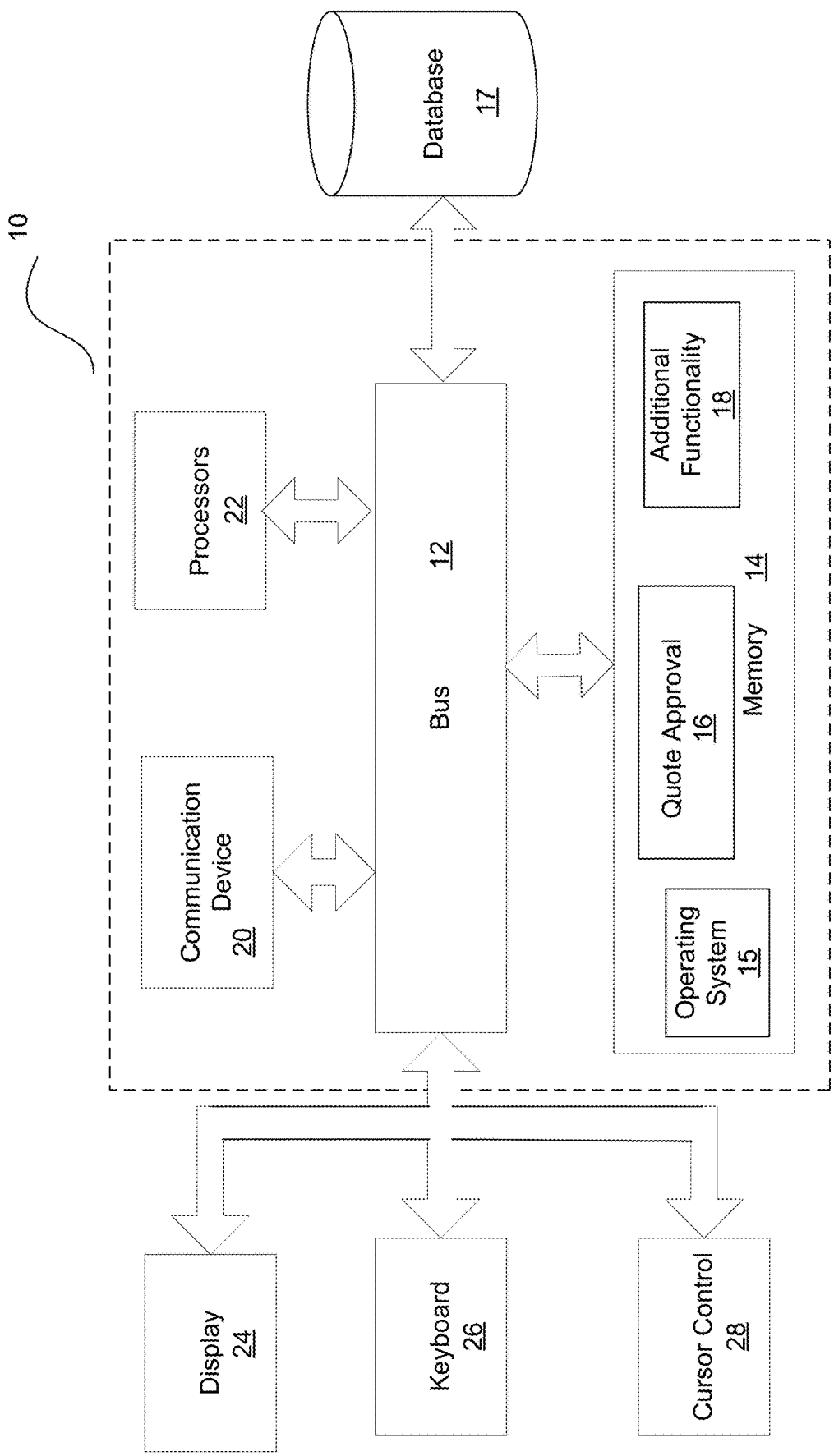
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 1, such as a keyboard or display.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a quote approval module 16 that provides enhanced quote approval functionality for a CPQ, and all other functionality disclosed herein. System 10 can be part of a larger system that uses the disclosed quote approval functionality, such as a CPQ system (e.g., "CPQ Cloud" from Oracle Corp.) or an Enterprise resource planning ("ERP") system. Therefore, system 10 can include one or more additional functional modules 18 to include the additional functionality. When processor 22 executes at least software module 16, system 10 becomes a special purpose computer provides enhanced quote approval functionality as disclosed herein.

A database 17 is coupled to bus 12 to provide centralized storage for modules 16 and 18 and store product attributes, financial data, inventory information, sales data, etc., and all other data needed for modules 15, 16 and/or 18. In one embodiment, database 17 is a relational database management system ("RDBMS") that can use Structured Query Language ("SQL") to manage the stored data. Database 17 may be local to the other components of FIG. 1, or remote such as on the cloud.

In one embodiment, particularly when there are a large number of configuration details to be searched, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations. The applications and computing system 10 may be configured to operate with or be implemented as a cloud-based networking system, a soft are-as-a-service ("SaaS") architecture, or other type of computing solution.

As disclosed above, a CPQ system or product/system configurator can generate a configuration and pricing for the configuration that is offered for sale to a user in the form of a quote. Typically, depending on predefined rules, the quote must be approved before being offered for sale. In embodiments, a quote approval is a step in a quote workflow that must pass before a quote can be sent to fulfillment services. Known systems such as "CPQ Cloud" from Oracle Corp. allow an administrator the ability to generate a tree based approval structure, forcing users to get approval from every node on the tree before the quote can be processed through the approval.

Quotes within known CPQ systems are processed through a customer defined workflow. This creates the steps that a quote can occupy, the actions that will move between the steps and the permission of each user able to view the quote at each step. One such specialized step is the submit for approval step. When that happens, the quote enters an approval hierarchy. This hierarchy defines a tree of approvals that must happen in a specified order before the quote is allowed to exit the pending approval state and be fully approved. Every node in the tree has rules defined to specify when that node should become active. For example, if a quote has a discount exceeding 20%, a rule may state that the quote needs managerial approval. This node only turns on when that discount is exceeded. Otherwise the node is bypassed.

In contrast to known CPQ systems, embodiments add a machine learning component to the end user approvals process to provide guidance on how the approval is likely to flow. Embodiments further provide guidance on what changes can be made to the quote to change the workflow of the quote (e.g., reduce the time required for approval). The guidance in embodiments is directed to the time an approval takes and the likelihood of the quote to get approved.

Embodiments provide functionality in three key areas to increase and enhance end user knowledge about the state of the quote: (1) Approvals status indication; (2) Approvals likelihood indication; and/or (3) Approvals time indication.

In embodiments, approvals take the form of a graph of nodes. Every level of approval can include multiple nodes and levels can be arranged in any order. A rejection in any approval node will result in a rejection of the full quote. Approval nodes must be navigated in order.

The approvals data are maintained in embodiments as a step in the quote workflow. That step has two outcomes (i.e., approved or rejected), and a time value (i.e., how long the quote existed at this step). The quote also maintains the attribute values of the quote at the time the quote moved into the pending approvals state. Attributes of the quote are any information related to the product or service that is the subject of the quote or the quote itself. Example attributes include a discount percentage of the quote (i.e., a numerical attribute), a line item total, the state of the purchase (i.e., a categorical attribute), the name of the person purchasing, etc.

The following are examples of a quote and quote attributes where approvals are triggered and can be enhanced using the functionality of embodiments of the invention:

Assume that a forklift is being sold by an equipment manufacturer to a loyal customer. The sales user adds a 35% discount for the customer because of their loyalty. This is above the standard limit of a 20% discount so direct manager approval is required.

Assume a gaming system is being sold. Due to the technology embedded in the system, export laws may be in effect. When the quote enters approval, the "Export" option is set to true, which triggers specific legal/security approval.

Assume a one off quote is being created for a customer who recently completed a large bulk order. Because of the previous order, the sales user selects the "Bulk Discount" option. When this option is selected on orders with fewer than 100 items, an approval from a Vice President ("VP") is required.

Assume a large order of generators is submitted to the system consisting of more than 100 tons of product to be shipped. This triggers an approval from the firm's logistics department to make sure the company is capable to ship the requested items.

Assume several cranes are ordered requesting a specialized high strength steel cable. The supply of this steel cable is low. Therefore, the existence of this type of cable in the parts list on the quote triggers approval from the VP of the supply division of the company to make sure the required materials are in stock.

Assume a sale is made for mining services with a foreign government. When the quote is pushed to the approval system, the fact that it is selling to a foreign government triggers a specific Foreign Corrupt Practices Act ("FCPA") review approval step in the flow.

Embodiments feed this data into a machine learning system to train the system. Specifically, embodiments feed in a past historical set of all quote attributes (or a relevant subset) and whether or not the quote was approved or the time taken for the quote to be approved. In order to find the relationship between attributes and approval likelihood (or approval time), any machine learning system can be used in embodiments. In one embodiment, the machine learning system is a neural network of linear neurons. After training the machine learning system, embodiments generate two functions: one mapping the set of attributes "($\{a\}$)" to the likelihood of getting an approval and one mapping the set of attributes to the time that an approval will take. The functions are defined as follows:

Likelihood=L($\{a\}$): Generated by the set containing all quote attribute values and the approve/reject data for each quote.

Time=T($\{a\}$): Generated by the set containing all quote attribute values and the approval step time length for each quote.

Both these functions are generated by the machine learning algorithm and will relate a quote attribute vector to a percentage likelihood of approval component or an absolute time value.

In embodiments, the machine learning system that generates the above two functions does so with gradient descent. Specifically, it iteratively calculates the gradient of the loss function at each neuron and moves the coefficient weights for each input attribute in the direction of a smaller loss. During training of a function $f_n(\{a\})$, for each input data point passed in ($\{a'\}$), two elements are calculated:

1. The current function's predicted value for $\{a'\}$ ($f_n(\{a'\})$) and how much that value differs from the known value associated to $\{a'\}$ in the training data set. The difference between the predicted value and the actual value is the error of the function for the current iteration. The variables of any loss function will in fact be the weights defined on each node in the function's neural network. That is, the loss function will be a function of all of the node coefficients.

2. Since $f_n(\ )$ is a known function (it is determined when the topology of the network is chosen), the gradient of the loss function can be calculated. To find where the minimum of this loss function is (which in real terms is the best predicted match of the function to the inputs), the coefficients are changed by a small amount in the most negative direction of the gradient. That is, the function $f_n(\ )$ is changed slightly as determined by the gradient taken on the coefficients of the function. Subsequently, a new function $f_{n+1}(\ )$ is determined. The same process is repeated many times until the algorithm is able to come very close to making the error 0.

As a result of the above, the optimal function is achieved. Embodiments answer the question of, given the present likelihood or time to approve values of each quote, what changes can be made to the quote to make the likelihood or time rise or fall. Since the gradient of the existing function is being calculated, attributes that would best influence the dependent variables of likelihood and time can be calculated.

Therefore, embodiments calculate the real number gradient (which is the n-dimensional slope of the likelihood or time prediction curve) and produce a weighted list for all relevant attributes of how significantly they influence the outcome. With this information, embodiments display to the user an indication of which changes should be made to the quote for optimal approval length and provide next step guidance to users. In general, the larger the gradient component for each attribute's weight, the more impact it has on moving the likelihood or the time to approve values.

Example 1

As an example of an embodiment, assume the following data set that includes 10 attributes, including categorical attributes (C1-C4) and numerical attributes (N5-N10):

| Category C1 | Category C2 | Category C3 | Category C4 | Number N5 | Number N6 | Number N7 | Number N8 | Number N9 | Number N10 | Output - Likelihood | Output - Time |
|---|---|---|---|---|---|---|---|---|---|---|---|
| 0 | 0 | 2 | 3 | 6.495143243 | 53.9853464 | 5 | 95.53986856 | 133.1543239 | 77.16217789 | 0 | — |
| 0 | 0 | 5 | 4 | 4.28987575 | 26.29129 | 15 | 27.312201 | 877.8658642 | 79.18299751 | 0 | — |
| 1 | 0 | 5 | 6 | 8.359881903 | 83.18348815 | 25 | 55.81503377 | 585.8442464 | 44.01166209 | 0 | — |
| 0 | 0 | 1 | 2 | 0.676883994 | 18.78680912 | 35 | 79.95464265 | 993.9859001 | 8.332405084 | 0 | — |
| 0 | 0 | 4 | 5 | 8.238647227 | 37.99070649 | 45 | 43.84775709 | 302.5998108 | 19.10696119 | 0 | — |
| 0 | 0 | 5 | 5 | 8.762606549 | 80.09452557 | 55 | 26.91453956 | 658.7310311 | 23.84139879 | 0 | — |
| 1 | 0 | 5 | 3 | 1.205636375 | 2.130799802 | 65 | 75.95235444 | 132.5033435 | 15.1053647 | 0 | — |
| 1 | 0 | 0 | 3 | 8.08752456 | 44.25132011 | 75 | 87.09241396 | 502.5093922 | 73.47849466 | 0 | — |
| 2 | 0 | 3 | 5 | 6.895272877 | 38.09947629 | 85 | 60.83298284 | 820.800703 | 9.20832436 | 0 | — |
| 0 | 0 | 4 | 0 | 6.813409027 | 14.93003907 | 95 | 93.83992596 | 530.6350765 | 40.92407365 | 0 | — |
| 1 | 1 | 2 | 5 | 0.965404344 | 0.403228222 | 10 | 14.06325369 | 704.783014 | 4.353862791 | 0 | — |
| 2 | 1 | 2 | 1 | 5.704165475 | 62.23064143 | 20 | 28.81185361 | 997.2275939 | 79.01969311 | 0 | — |
| 2 | 1 | 0 | 2 | 9.830447174 | 99.12768992 | 30 | 50.74409529 | 863.9507489 | 42.08984358 | 0 | — |
| 2 | 1 | 1 | 5 | 6.215915675 | 27.05893399 | 40 | 68.10618573 | 46.68960487 | 55.98646446 | 0 | — |
| 0 | 1 | 3 | 0 | 7.20802661 | 82.13275186 | 50 | 99.46204549 | 329.6829464 | 73.97227131 | 1 | 5 |
| 1 | 1 | 2 | 3 | 9.203771522 | 9.565180145 | 60 | 95.41335892 | 592.0795505 | 25.45765682 | 1 | 6 |
| 2 | 1 | 2 | 1 | 6.875848271 | 94.41892138 | 70 | 11.07895765 | 913.0914294 | 18.96652152 | 1 | 7 |
| 2 | 1 | 5 | 6 | 0.541091647 | 83.22869019 | 80 | 6.68256302 | 47.60812898 | 99.64587829 | 1 | 8 |
| 0 | 1 | 2 | 1 | 5.124997669 | 3.119085906 | 90 | 32.54646579 | 556.2994681 | 0.449008 | 1 | 9 |
| 1 | 1 | 2 | 6 | 9.542795389 | 77.72751437 | 100 | 78.28769594 | 745.5394366 | 26.13156397 | 1 | 10 |
| 2 | 2 | 1 | 4 | 1.316697914 | 4.210211855 | 2 | 47.97478217 | 554.871315 | 32.9139452 | 0 | — |
| 1 | 2 | 0 | 7 | 7.188306841 | 78.83828041 | 12 | 58.77908743 | 561.6066324 | 8.174007162 | 0 | — |
| 2 | 2 | 5 | 4 | 8.24211997 | 31.70889565 | 22 | 57.28061573 | 776.6692518 | 40.79519692 | 0 | — |
| 2 | 2 | 1 | 0 | 7.306281259 | 90.55238681 | 32 | 42.83466061 | 300.6493848 | 17.15215289 | 0 | — |
| 0 | 2 | 4 | 5 | 3.329868147 | 82.40462823 | 42 | 35.77223375 | 263.1093391 | 91.80904775 | 0 | — |
| 2 | 2 | 3 | 7 | 7.553491735 | 48.08013882 | 52 | 34.55662006 | 851.873763 | 57.44285319 | 0 | — |
| 2 | 2 | 1 | 4 | 6.119757798 | 93.89690198 | 62 | 96.5696378 | 159.0307283 | 77.10025786 | 0 | — |
| 0 | 2 | 4 | 0 | 3.649884292 | 60.4204693 | 72 | 92.09081777 | 688.7255506 | 18.43600676 | 0 | — |
| 1 | 2 | 5 | 2 | 9.78802884 | 94.56270594 | 82 | 39.07038234 | 492.6542277 | 55.61828996 | 0 | — |
| 1 | 2 | 2 | 3 | 3.066745444 | 90.45104174 | 92 | 19.66472227 | 325.4636196 | 68.99485025 | 0 | — |
| 1 | 3 | 1 | 6 | 2.697107981 | 73.79984882 | 8 | 40.43612699 | 483.5938179 | 68.49541422 | 0 | — |
| 1 | 3 | 5 | 7 | 8.069590219 | 34.0801769 | 18 | 62.35311437 | 37.74981167 | 38.29375811 | 0 | — |
| 2 | 3 | 3 | 0 | 2.042267925 | 94.9607249 | 28 | 27.75552481 | 754.5874632 | 22.88024778 | 0 | — |
| 0 | 3 | 1 | 7 | 8.247930202 | 53.21745125 | 38 | 96.76960283 | 760.2352187 | 18.14208914 | 0 | — |
| 2 | 3 | 1 | 6 | 4.726675105 | 3.059525703 | 48 | 43.2362592 | 464.6885407 | 15.25987279 | 1 | 4 |
| 0 | 3 | 0 | 1 | 9.555521685 | 10.39694234 | 58 | 53.78839166 | 703.9343386 | 69.54174297 | 1 | 5 |
| 2 | 3 | 0 | 7 | 0.495636078 | 22.76949234 | 68 | 63.24197486 | 711.841831 | 42.45496713 | 1 | 6 |
| 0 | 3 | 1 | 0 | 6.751326015 | 71.10342741 | 78 | 22.58962468 | 526.9667257 | 63.65592691 | 1 | 7 |
| 2 | 3 | 0 | 4 | 6.237390634 | 46.48728978 | 88 | 93.43233288 | 669.0006737 | 82.12466115 | 1 | 8 |
| 2 | 3 | 0 | 7 | 6.238268211 | 96.98075558 | 98 | 58.82812759 | 358.2251893 | 91.69766715 | 1 | 9 |
| 2 | 4 | 3 | 1 | 8.003196394 | 8.847137267 | 5 | 80.66788247 | 626.1682598 | 68.33429156 | 0 | — |
| 0 | 4 | 0 | 3 | 4.307905839 | 56.42973991 | 15 | 71.96930535 | 411.810744 | 12.29264395 | 0 | — |
| 2 | 4 | 5 | 6 | 3.976796721 | 7.799382212 | 25 | 74.62909478 | 489.2832926 | 40.61929822 | 0 | — |
| 1 | 4 | 0 | 7 | 3.97266237 | 35.95729578 | 35 | 78.70387251 | 682.7084834 | 31.90423582 | 0 | — |
| 0 | 4 | 1 | 3 | 7.604834382 | 75.50467657 | 45 | 39.84645074 | 111.5171441 | 91.48233839 | 0 | — |
| 0 | 4 | 0 | 2 | 4.996883102 | 70.06843531 | 55 | 83.59217329 | 812.8300317 | 7.843340358 | 0 | — |
| 0 | 4 | 3 | 1 | 7.015827769 | 55.28246733 | 65 | 81.94566374 | 129.7957661 | 68.74736348 | 0 | — |
| 0 | 4 | 3 | 6 | 4.065114409 | 97.02989251 | 75 | 18.00260994 | 625.4247656 | 78.69127581 | 0 | — |
| 1 | 4 | 3 | 4 | 4.324621738 | 40.8456703 | 85 | 61.13157492 | 441.3954103 | 55.08237328 | 0 | — |
| 0 | 4 | 3 | 4 | 3.836406529 | 42.50234014 | 95 | 85.28806839 | 85.03476386 | 75.88278946 | 0 | — |
| 2 | 5 | 0 | 3 | 7.682416956 | 90.34635423 | 10 | 51.67117026 | 162.2451052 | 19.85602748 | 0 | — |
| 0 | 5 | 3 | 5 | 7.168145995 | 12.69416286 | 20 | 71.53580733 | 985.7035345 | 53.20130898 | 0 | — |
| 1 | 5 | 5 | 7 | 7.032183037 | 13.03787014 | 30 | 35.14322025 | 366.4873761 | 59.9987608 | 0 | — |
| 0 | 5 | 1 | 6 | 4.581931133 | 19.39318853 | 40 | 21.59277583 | 42.25188125 | 98.95609029 | 0 | — |
| 1 | 5 | 4 | 1 | 2.266865818 | 96.31761469 | 50 | 36.82893578 | 949.4385477 | 57.11249479 | 1 | 5 |
| 1 | 5 | 5 | 6 | 3.051406526 | 20.2750649 | 60 | 29.42651338 | 906.9905431 | 34.24244388 | 1 | 6 |
| 1 | 5 | 1 | 1 | 3.105063975 | 19.67657258 | 70 | 27.27329798 | 539.5347717 | 76.87417928 | 1 | 7 |
| 1 | 5 | 4 | 0 | 2.199206195 | 97.20727944 | 80 | 44.46675948 | 771.6102853 | 57.26193252 | 1 | 8 |
| 2 | 5 | 0 | 7 | 6.564855845 | 12.91607262 | 90 | 14.6740276 | 801.376424 | 27.59289244 | 1 | 9 |
| 2 | 5 | 2 | 5 | 5.648447451 | 48.22651076 | 100 | 39.85442275 | 820.7554917 | 49.80879935 | 1 | 10 |
| 1 | 6 | 2 | 6 | 1.892033167 | 92.80558197 | 2 | 71.43602812 | 337.9507061 | 0.728105276 | 0 | — |
| 2 | 6 | 3 | 5 | 6.373304937 | 66.85105096 | 12 | 93.41451029 | 34.03630356 | 5.47131845 | 0 | — |
| 2 | 6 | 0 | 1 | 7.296211744 | 42.69165347 | 22 | 0.434677244 | 354.2164082 | 77.90157551 | 0 | — |
| 2 | 6 | 1 | 4 | 2.884692548 | 74.41621668 | 32 | 11.57148021 | 931.650732 | 31.41866876 | 0 | — |
| 1 | 6 | 3 | 0 | 2.403970391 | 23.35716644 | 42 | 37.5433218 | 943.6238633 | 7.299101732 | 1 | 4 |
| 0 | 6 | 1 | 5 | 5.330855691 | 1.190311401 | 52 | 28.69430394 | 16.1586225 | 12.90661019 | 1 | 5 |
| 0 | 6 | 4 | 3 | 3.52921779 | 9.54434225 | 62 | 8.38418883 | 515.5626844 | 8.713613946 | 1 | 6 |
| 1 | 6 | 4 | 1 | 5.661196606 | 1.007811055 | 72 | 73.41749298 | 795.7179208 | 81.26549621 | 1 | 7 |
| 1 | 6 | 0 | 3 | 1.936351717 | 8.484136103 | 82 | 28.90585109 | 920.9110479 | 0.104209306 | 1 | 8 |
| 0 | 6 | 3 | 2 | 1.7675365 | 72.44685554 | 92 | 23.59218702 | 916.3472004 | 99.01433504 | 1 | 9 |
| 2 | 7 | 0 | 5 | 8.423889874 | 4.918727995 | 8 | 84.74185765 | 907.1421197 | 14.63253682 | 0 | — |
| 0 | 7 | 1 | 1 | 0.608424857 | 19.80320644 | 18 | 68.86162105 | 173.2821681 | 89.02432982 | 0 | — |
| 2 | 7 | 1 | 3 | 0.126053549 | 72.99953176 | 28 | 58.76472584 | 492.4968169 | 13.73737802 | 0 | — |
| 2 | 7 | 0 | 1 | 8.286207653 | 96.89421913 | 38 | 22.20598667 | 619.1454077 | 7.859572483 | 0 | — |
| 2 | 7 | 3 | 7 | 7.967299076 | 19.58671346 | 48 | 39.56717033 | 601.0277005 | 65.08421536 | 0 | — |
| 1 | 7 | 2 | 0 | 9.426754359 | 68.61866497 | 58 | 32.64333259 | 296.9889355 | 23.70218536 | 0 | — |
| 1 | 7 | 3 | 2 | 9.817267172 | 38.93276124 | 68 | 96.69494088 | 34.72554938 | 30.60536923 | 0 | — |

-continued

| Category C1 | Category C2 | Categor C3 | Category C4 | Number N5 | Number N6 | Number N7 | Number N8 | Number N9 | Number N10 | Output - Likelihood | Output - Time |
|---|---|---|---|---|---|---|---|---|---|---|---|
| 0 | 7 | 3 | 0 | 3.787458108 | 32.12792726 | 78 | 44.87562694 | 290.9502401 | 47.06539502 | 0 | — |
| 1 | 7 | 3 | 7 | 3.120871341 | 7.970666955 | 88 | 14.77640024 | 555.2521601 | 15.5228988 | 0 | — |
| 1 | 7 | 4 | 0 | 4.868490562 | 6.221691269 | 98 | 88.26246109 | 116.1817146 | 60.16236017 | 0 | — |

Category 2 (C2) and number 7 (N7) are the only two components of real data in this simplified example. The rest are randomly generated noise in the example, because only changes in C2 and N7 have any effect on the output likelihood value. Having noise shows how the algorithm can discern the determining factors. The underlying relationship in the above data is the following:

If C2 is in (1, 3, 5, 6) and N7>40, the quote will be approved. The time for approval is directly proportional to the value of N7.

If C2 is in (0, 2, 4, 7), the quote is not approved.

In the above example, there is a mixture of categorical and numeric attributes getting fed into the machine learning system. Different types of algorithms can be used for modelling, as long as the gradient is measured at the end. In one embodiment, a linear function is used to model with some activation function that makes it easy to calculate the gradient at the end. The data set in the above example is relatively simple so learning will be quick and accurate. Real world data is generally much more complicated, requiring a larger network, but the same principle applies.

Figure 2A:
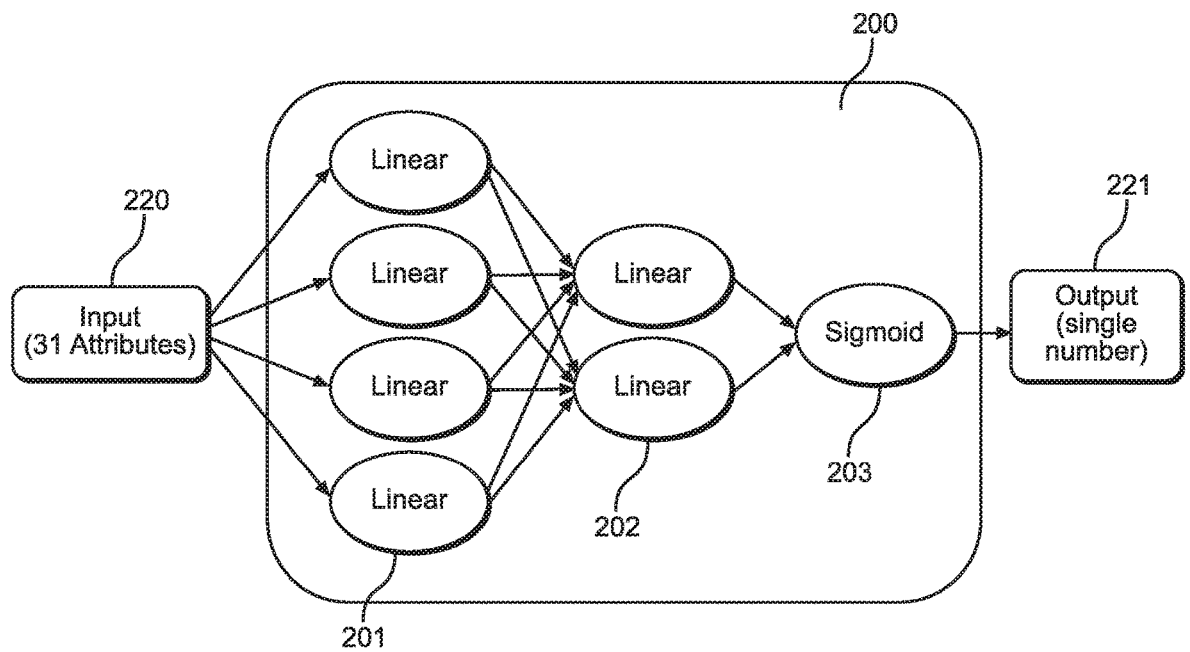
FIG. 2A illustrates an example neural network in accordance with embodiments of the invention.

After the machine learning for determining the time to approve the quote, as disclosed above, embodiments then perform machine learning to determine the likelihood that the quote will be approved. FIG. 2A illustrates a neural network in accordance with embodiments of the invention. Network 200 includes three layers: layer 201 has 4 linear neurons, layer 202 has 2 linear neurons, and layer 203 has a single neuron with a sigmoid activation function on it. The input 220 includes 31 attributes, and the output 221 includes a single number. In other embodiments, more complex networks can be used, including networks where the linear layers learn weights for the inputs and the sigmoid last layer allows for a non-linear function. Other embodiments of networks can, for example, have a non-linear node in the network and the last layer could be any activation function to map output to a 0 to 1 value range.

Figure 2B:
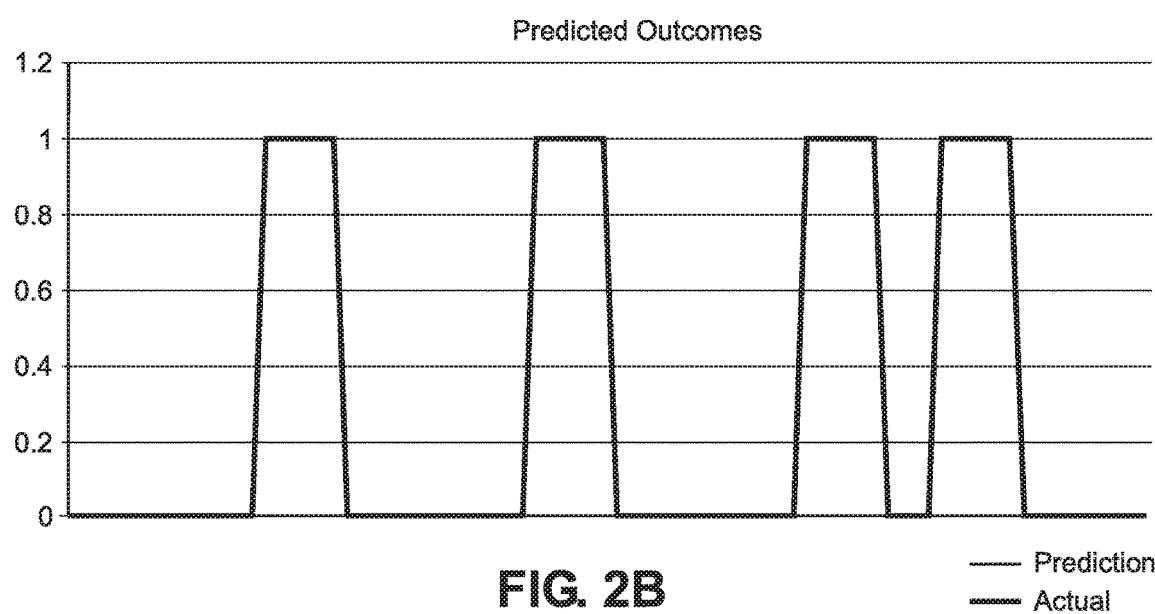
FIG. 2B is a plot illustrating what is learned in accordance to embodiments.

FIG. 2B is a plot illustrating what is learned in accordance to embodiments. In FIG. 2B, the x-axis is the row number of the input data and the y-axis is the output likelihood. As shown in FIG. 2B, the predicted and actual values lie nearly on top of each other.

Embodiments next recommend which attributes to change and what to do with them. This is considered "perfect learning" because the error in the machine learning came out to be 0. It can perfectly predict all data points in the training data set. The data that was passed in is very clean. At this point, embodiments can allow for a selection of an input variable and check what the gradient is at this point. The network that has been disclosed above reduces ultimately to the following function:

$$f(x)=1/(1+e^{\wedge}(Mx))$$

This is because linear functions of linear functions are linear functions. The deep network of linear function can therefore be represented as a single linear multiplier. In this case, both M and x are vectors so x breaks down into (x1, x2, x3, . . . , xn) as does M. Therefore, Mx is really (M1, M2, M3, . . . , Mn). The gradient calculation for this function is:

$$f(x)=f(x)*(1-f(x))*M$$

Figure 3:
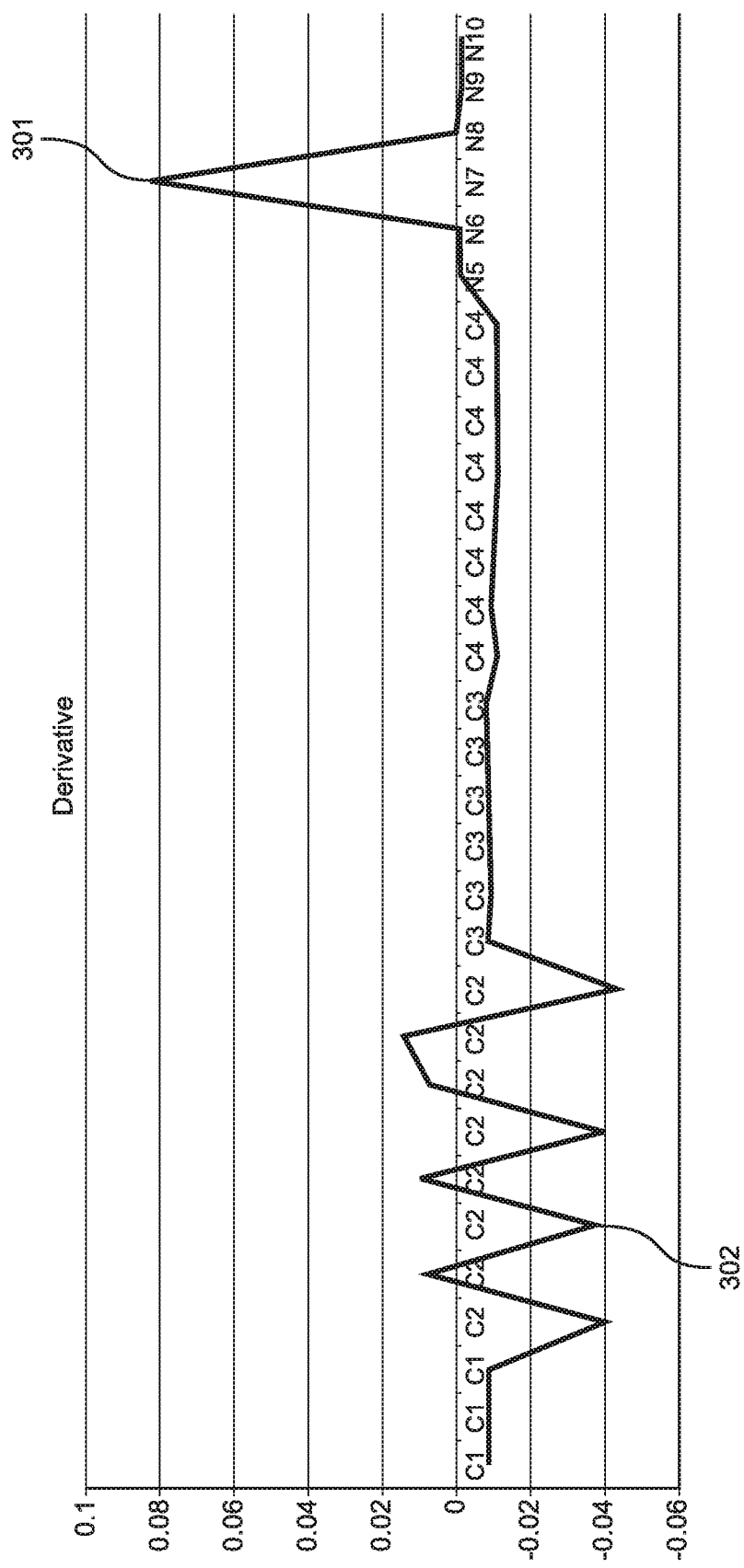
FIG. 3 illustrates the gradient at a specific point in accordance to embodiments for each of the attributes.

This derives from the definition of the sigmoid function $(1/(1-e^{\wedge}x))$ and the chain rule. More complicated, non-linear networks will result in more complicated gradients, FIG. 3 illustrates the gradient at a specific point in accordance to embodiments for each of the attributes. There are categorical and numeric attributes. For numeric attributes (N5-N10), it is shown that N7 spikes high at 301. There are two things to derive from FIG. 3. First, the gradient value for the N7 attribute is large. This means that as N7 changes those changes will have a high impact on the likelihood of approval. Second, the value is positive, meaning that as N7 rises so does approval likelihood. This is consistent with expectations, as it is known that values of N7 below 40 are not approved, Categorical attributes can be more difficult. C2 has been split into 8 different input variables at 302, with each one being on or off (a one hot encoded vector). The gradient for each one of these subcategories shows great variation. The gradient component for C2 has a highly negative value at (1,0,0,0,0,0,0,0), or 0, or selecting 0 for that attribute (turning the "0 feature" on) means that the likelihood of an approval will drop significantly. For value 6 on C2, of (0,0,0,0,0,0,1,0) the gradient component is positive, meaning that it positively influences the approval.

The other categorical attributes have no differentiation between the distinct values. There are no peaks in the gradient curve, but a plateau. Similarly, for numeric attributes that do not drive approval, their gradient component is near 0, Therefore, attributes can be derived that drive the likelihood of approval with the following rules:

For numeric attributes, gradient values for each attribute (the derivative with respect to that attribute) that are large in magnitude will have a large impact on the approval value.

For categorical attributes, the attributes that are the highest driver of approval are those with the greatest difference between the vector components of the measured gradient.

The following application of the Example 1 uses C2 and N7 values, as all other attributes are meaningless as indicated in FIG. 3:

1. C2=0, N7=30. Embodiments will predict an approval likelihood of 3.48499E-40, which is very low. The analysis of N7 recommends that its value get increased. The analysis of C2 recommends that it go to the highest derivative value (i.e., 6). If C2 is changed to 6, the approval likelihood rises to 0.17%. This is still very low, but indicates that the example is on the cusp of getting a good approval likelihood. If N7 is raised from 0.3, to 0.4, the likelihood of approval rises to 99.86%, which is good.

2. C2=1, N7=30. The predicted likelihood for this scenario is 5.42179E-08, which is very low. Embodiments will recommend that N7 increase in value. The higher the N7, the higher the approval likelihood. When looking at C2, it will determine that the optimized value of C2 is 6, but the difference in their individual gradient components is small so the recommendation is weak. Instead, embodiments will just recommend N7 to go higher. If N7=40, there is a 2.21% likelihood of approval. If N7=45, there is a 93.60% likelihood of approval.

3. C2=6, N7=70. The predicted likelihood for this scenario is an approval 100% of the time. The gradient will actually be 0 in all cases (see gradient formula above) so no recommendation can be made.

4. C2=6, N7=50. This predicts an approval likelihood of 99.9999997%. The gradient will not be 0, but be very small. In this case, embodiments will still recommend increasing N7, but the increase will be a weak recommendation.

From the above examples, it is shown that the scale of the gradient does not change shape, but does in fact change magnitude. This is a consequence of the simplicity of the model used in the examples. However, in embodiments that use more complex models, this may not be the case. In general, embodiments not only learn the approval likelihood, but give a recommendation about the actions to take to increase it.

Example 2

In Example 2, the same dataset from Example 1 is used but the analysis is for the purpose of determining the time to approve a quote. In this embodiment, the learning algorithm is changed from a categorical learning algorithm to learning a trend line of the data. In this embodiment, for all of the data that are not approved because it the quote was never approved, the approval time has no meaning. In this example some extra data is added to the set from Example 1 to learn on that will have some different values for N7:

| Category C1 | Category C2 | Categor C3 | Category C4 | Number N5 | Number N6 | Number N7 | Number N8 | Number N9 | Number N10 | Output - Time |
|---|---|---|---|---|---|---|---|---|---|---|
| 0 | 1 | 3 | 0 | 7.208027 | 82.13275 | 50 | 99.46205 | 329.6829 | 73.97227 | 5 |
| 1 | 1 | 2 | 3 | 9.203772 | 9.56518 | 60 | 95.41336 | 592.0796 | 25.45766 | 6 |
| 2 | 1 | 2 | 1 | 6.875848 | 94.41892 | 70 | 11.07896 | 913.0914 | 18.96652 | 7 |
| 2 | 1 | 5 | 6 | 0.541092 | 83.22869 | 80 | 6.682563 | 47.60813 | 99.64588 | 8 |
| 0 | 1 | 2 | 1 | 5.124998 | 3.119086 | 90 | 32.54647 | 556.2995 | 0.449008 | 9 |
| 1 | 1 | 2 | 6 | 9.542795 | 77.72751 | 100 | 78.2877 | 745.5394 | 26.13156 | 10 |
| 2 | 3 | 1 | 6 | 4.726675 | 3.059526 | 48 | 43.23626 | 464.6885 | 15.25987 | 4 |
| 0 | 3 | 0 | 1 | 9.555522 | 10.39694 | 58 | 53.78839 | 703.9343 | 69.54174 | 5 |
| 2 | 3 | 0 | 7 | 0.495636 | 22.76949 | 68 | 63.24197 | 711.8418 | 42.45497 | 6 |
| 0 | 3 | 1 | 0 | 6.751326 | 71.10343 | 78 | 22.58962 | 526.9667 | 63.65593 | 7 |
| 2 | 3 | 0 | 4 | 6.237391 | 46.48729 | 88 | 93.43233 | 669.0007 | 82.12466 | 8 |
| 2 | 3 | 0 | 7 | 6.238268 | 96.98076 | 98 | 58.82813 | 358.2252 | 91.69767 | 9 |
| 1 | 5 | 4 | 1 | 2.266866 | 96.31761 | 50 | 36.82894 | 949.4385 | 57.11249 | 5 |
| 1 | 5 | 5 | 6 | 3.051407 | 20.27506 | 60 | 29.42651 | 906.9905 | 34.24244 | 6 |
| 1 | 5 | 1 | 1 | 3.105064 | 19.67657 | 70 | 27.2733 | 539.5348 | 76.87418 | 7 |
| 1 | 5 | 4 | 0 | 2.199206 | 97.20728 | 80 | 44.46676 | 771.6103 | 57.26193 | 8 |
| 2 | 5 | 0 | 7 | 6.564856 | 12.91607 | 90 | 14.67403 | 801.3764 | 27.59289 | 9 |
| 2 | 5 | 2 | 5 | 5.648447 | 48.22651 | 100 | 39.85244 | 820.7555 | 49.8088 | 10 |
| 1 | 6 | 3 | 0 | 2.40397 | 23.35717 | 42 | 37.54332 | 943.6239 | 7.299102 | 4 |
| 0 | 6 | 4 | 5 | 5.330856 | 1.190311 | 52 | 28.6943 | 16.15862 | 12.90661 | 5 |
| 0 | 6 | 4 | 3 | 3.529218 | 9.544342 | 62 | 8.384189 | 515.5627 | 8.713614 | 6 |
| 1 | 6 | 4 | 1 | 5.661197 | 1.007811 | 72 | 73.41749 | 795.7179 | 81.2655 | 7 |
| 1 | 6 | 0 | 3 | 1.936352 | 8.484136 | 82 | 28.90585 | 920.911 | 0.104209 | 8 |
| 0 | 6 | 3 | 2 | 1.767537 | 72.44686 | 92 | 23.59219 | 916.3472 | 99.01434 | 9 |
| 0 | 1 | 3 | 0 | 7.208027 | 82.13275 | 10 | 99.46205 | 329.6829 | 73.97227 | 50 |
| 1 | 1 | 2 | 3 | 9.203772 | 9.56518 | 20 | 95.41336 | 592.0796 | 25.45766 | 40 |
| 2 | 1 | 2 | 1 | 6.875848 | 94.41892 | 30 | 11.07896 | 913.0914 | 18.96652 | 30 |
| 2 | 1 | 5 | 6 | 0.541092 | 83.22869 | 80 | 6.682563 | 47.60813 | 99.64588 | 8 |
| 0 | 1 | 2 | 1 | 5.124998 | 3.119086 | 90 | 32.54647 | 556.2995 | 0.449008 | 9 |
| 1 | 1 | 2 | 6 | 9.542795 | 77.72751 | 100 | 78.2877 | 745.5394 | 26.13156 | 10 |
| 2 | 3 | 1 | 6 | 4.726675 | 3.059526 | 8 | 43.23626 | 464.6885 | 15.25987 | 60 |
| 0 | 3 | 0 | 1 | 9.555522 | 10.39694 | 18 | 53.78839 | 703.9343 | 69.54174 | 50 |
| 2 | 3 | 0 | 7 | 0.495636 | 22.76949 | 28 | 63.24197 | 711.8418 | 42.45497 | 40 |
| 0 | 3 | 1 | 0 | 6.751326 | 71.10343 | 38 | 22.58962 | 526.9667 | 63.65593 | 30 |
| 2 | 3 | 0 | 4 | 6.237391 | 46.48729 | 88 | 93.43233 | 669.0007 | 82.12466 | 8 |
| 2 | 3 | 0 | 7 | 6.238268 | 96.98076 | 98 | 58.82813 | 358.2252 | 91.69767 | 9 |
| 1 | 5 | 4 | 1 | 2.266866 | 96.31761 | 50 | 36.82894 | 949.4385 | 57.11249 | 5 |
| 1 | 5 | 5 | 6 | 3.051407 | 20.27506 | 60 | 29.42651 | 906.9905 | 34.24244 | 6 |
| 1 | 5 | 1 | 1 | 3.105064 | 19.67657 | 70 | 27.2733 | 539.5348 | 76.87418 | 7 |
| 1 | 5 | 4 | 0 | 2.199206 | 97.20728 | 80 | 44.46676 | 771.6103 | 57.26193 | 8 |
| 2 | 5 | 0 | 7 | 6.564856 | 12.91607 | 90 | 14.67403 | 801.3764 | 27.59289 | 9 |
| 2 | 5 | 2 | 5 | 5.648447 | 48.22651 | 100 | 39.85244 | 820.7555 | 49.8088 | 10 |
| 1 | 6 | 3 | 0 | 2.40397 | 23.35717 | 2 | 37.54332 | 943.6239 | 7.299102 | 60 |
| 0 | 6 | 1 | 5 | 5.330856 | 1.190311 | 12 | 28.6943 | 16.15862 | 12.90661 | 50 |
| 0 | 6 | 4 | 3 | 3.529218 | 9.544342 | 22 | 8.384189 | 515.5627 | 8.713614 | 40 |
| 1 | 6 | 4 | 1 | 5.661197 | 1.007811 | 72 | 73.41749 | 795.7179 | 81.2655 | 7 |
| 1 | 6 | 0 | 3 | 1.936352 | 8.484136 | 82 | 28.90585 | 920.911 | 0.104209 | 8 |
| 0 | 6 | 3 | 2 | 1.767537 | 72.44686 | 92 | 23.59219 | 916.3472 | 99.01434 | 9 |

This is the same data set as in Example 1 above, but includes some extra records where N7 is less than 40, Since these lines are not optimal, the time of approval is high. In order to learn this, the neural network is revised to a more complicated definition in contrast to Example 1.

Figure 4A:
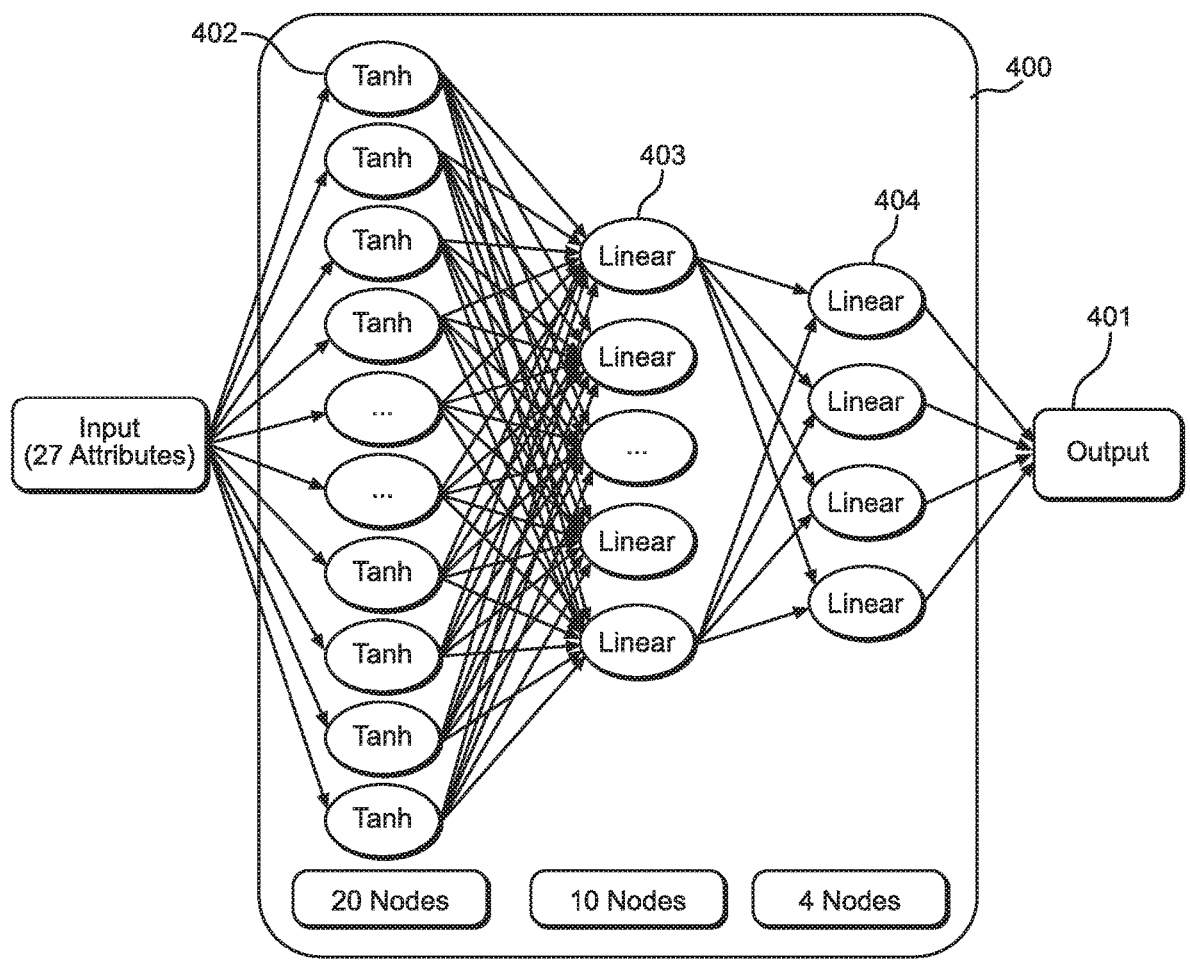
FIG. 4A illustrates an example neural network that can be used to predict approval time to approve a quote in accordance to an embodiment of the invention.
Figure 4B:
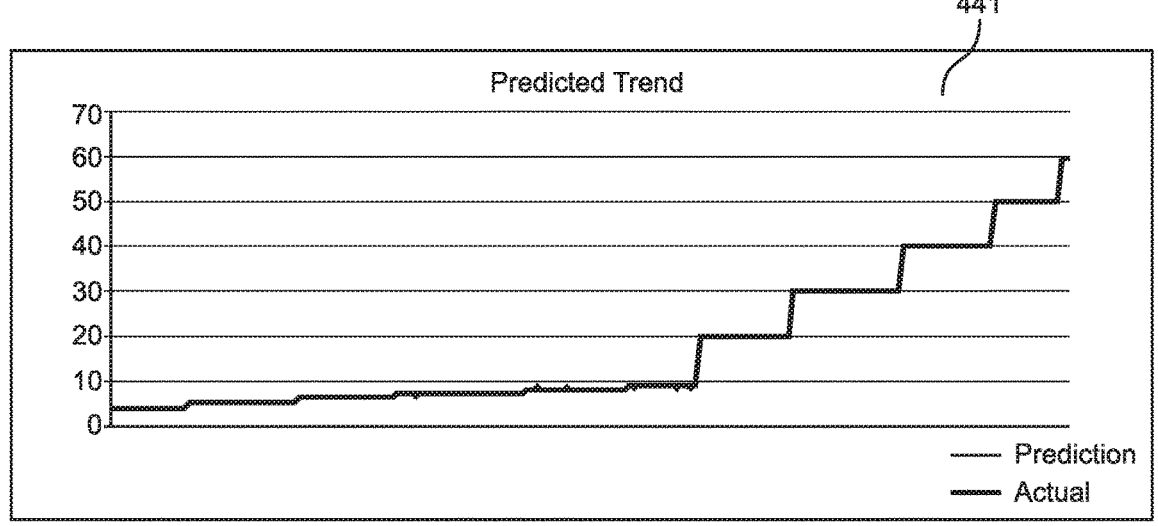
FIG. 4B illustrates a graph of the modelling of an output of the neural network in accordance to an embodiment of the invention.

FIG. 4A illustrates a neural network 400 that can be used to predict approval time to approve a quote in accordance to an embodiment of the invention. In comparison to network 200, network 400 is a more complex network. The output 401 is not necessarily linear so a non-linear component is added to network 400. In the first layer 402 of the network, tan h nodes (i.e., non-linear components) are followed by linear nodes in the second layer 403, 404. This ensures that the non-linear function can be modeled and the linear nodes make sure a full function map to the output can be performed. As a result, output 401 gets modelled with this network as shown in graph 441 in FIG. 4B (reordered to be an increasing graph (i.e., would look similar to the graph of FIG. 2B if the data was ordered differently in the x-axis)).

As shown, network 400 has learned the trend well. The gradient of this function is such that it is significantly different depending on the particular point because the tan h function does not have a constant gradient. Looking at the value at individual points, one would expect to see the attribute with the greatest gradient to be the one where a change will affect the output to the greatest extent. For example, looking at a test point that maps to 20 days as shown on graph 501 of FIG. 5A:
Input: 1,1,2,3,1.486538744,71.60306092,36,4.996422959, 341.2976196,56.0979154,20
There is a spike in attribute N7 (at 505). That means that this attribute is going to be the biggest impact on the output. This is what is expected based upon the relationship that was coded into the input data. Graph 502 of FIG. 5B displays another input:
Input: 0,2,3,1,6.505569615,79.42243533,45,56.91429068, 128,577184,37.55258624,4
Here, the curve looks very similar, but the scale here is completely different. N7 spikes above all other attributes (at 515), but the magnitude of all attributes is reduced. This is because the level that is being modeled to is smaller.

Figure 5A:
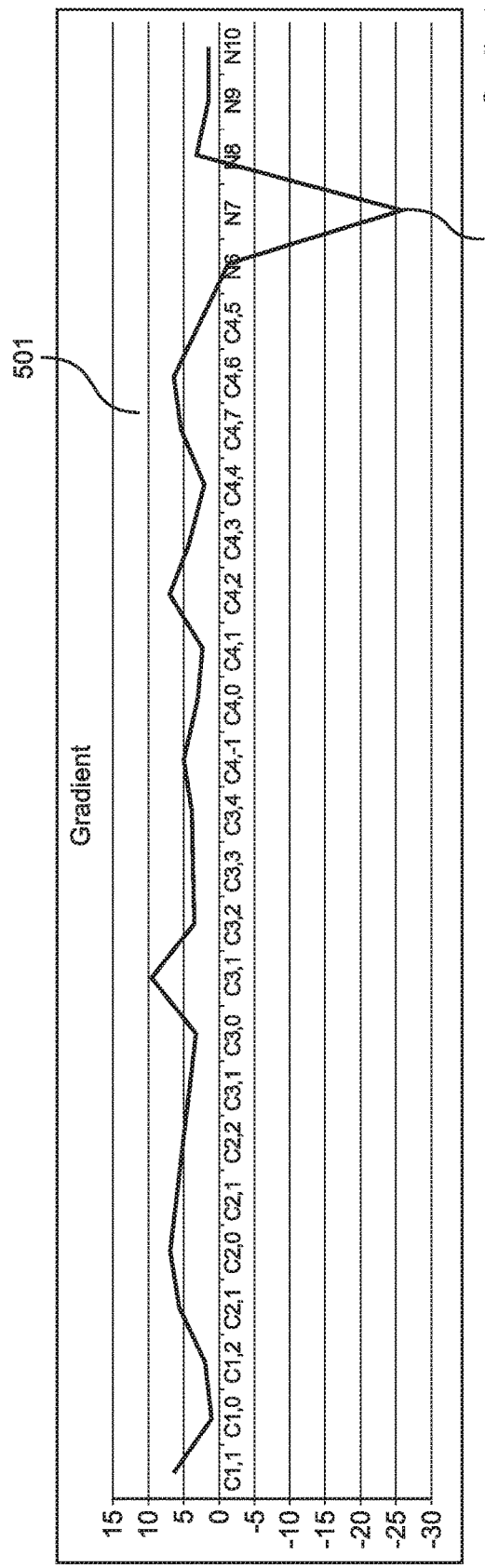
FIG. 5A illustrates a graph of the modelling of an output of the neural network in accordance to an embodiment of the invention.
Figure 5B:
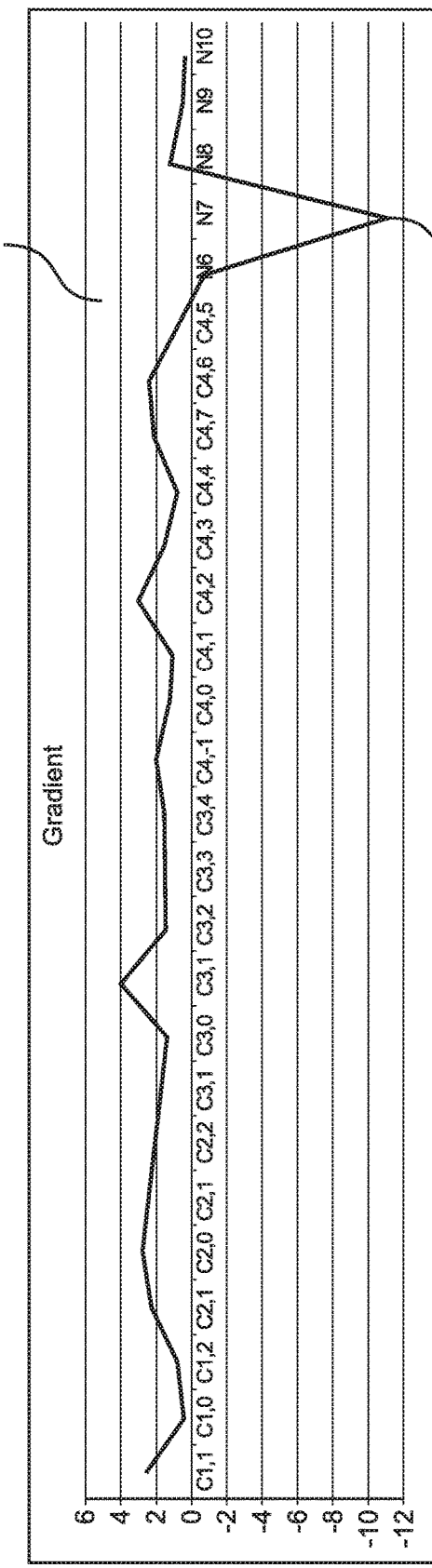
FIG. 5B illustrates a graph of the modelling of an output of the neural network in accordance to an embodiment of the invention.

As shown in FIGS. 5A and 5B, this is a simple relationship. There are no other attributes to learn a relationship with since N7 is the sole driver in this scenario. However, as can be seen at all points (2 examples included) N7 stands above other attributes on the gradient graph, meaning that it is the attribute that would be singled out to recommend a change in order to change the approval time value. Therefore, for an approvals type question, an action recommendation can be determined from the overall gradient calculation.

Approval Status Indicators

Embodiments provide the user viewing the quote with a visual indication of the route that is required for the quote to become approved. Users ready to submit for an approval will benefit from a visual inspection of the approval tree to see which nodes in the tree will be active for approval. The core components are a visual display of the complexity of the hierarchy showing each node. The tree object can be drilled into to view details about the approvers and the rules that have kicked off to active that node.

Figure 6A:
FIGS. 6A-6C illustrate graphical user interfaces that are presented to a user as part of the quote approval process in accordance to one embodiment.
Figure 6B:
Figure 6C:

FIGS. 6A-6C illustrate graphical user interfaces that are presented to a user as part of the quote approval process in accordance to one embodiment. As shown in FIG. 6A, an icon indicator is rendered on an Approval tab 601. If all approval requirements have been satisfied (including if no approvals are needed) then the icon is a green checkmark. If one or more approvals are required then the icon is a warning indicator, as shown in FIG. 6A.

Within the contents of the Approval tab (FIGS. 6B and 6C) a hierarchical graph 602 or 603 is rendered to show the status of approval requirements. Each approval step corresponds with an icon in a hierarchical graph. In addition to color as an indicator of status, a user can focus, click, and mouse-over the icons to view a tooltip with full information. As an example, Grey can indicate that approval is required (the reason evaluated to true), and no action has yet been returned. Green can indicate the approval has been satisfied (approved or none needed). Red can indicate that an approval step was rejected.

As disclosed above, the approvals likelihood indication is a machine learned value. The approval server/system will look upon historical data to learn a trend of how input attributes will affect the output likelihood of getting an approval. In addition to giving a value for the likelihood of an approval for the quote overall, embodiments will show how to change and the direction to change specific attribute values to increase the likelihood of getting an approval.

Similarly, the approvals time indication is also a machine learned value and will display to the user the anticipated time that it will take to get an approval of a quote.

As disclosed, for the approvals likelihood and time indicators, a neural network model is generated. Input in this scenario will be the list of all appropriate attributes on the quote that is entering the approval stage. Further, in embodiments, clearly non-determining attributes are excluded. For example, in one embodiment the following attributes are cleansed off of the quote:
HTML attributes.
RTE attributes.
Distinct ID attributes (quote ID, document ID, etc. . . . ).
Constant attributes (attributes the same on every quote).
Once this cleansing is complete, the remaining attributes will be a subset ready to be fed into the neural network learning system. In embodiments, numeric attributes need to be normalized to be between 0 and 1 and categorical attributes needs to be turned into one hot encoded vectors. As an example of a hot encoded vector, assume that an attribute for hair color that can be Brown, Black, or Blonde, for a categorical attribute with 3 categories. It could be represented numerically many ways. For example, Brown can be mapped to 1, Black to 2, and Blonde to 3. However, a machine would learn that Blonde>Black>Brown by the nature of how they have been mapped. This is undesirable because that relationship does not exist. Instead, embodiments map them to a one hot encoded vector, which will establish a component for each attribute and it will be a 0 if it is not selected or a 1 if it is. In that case Brown is [1,0,0], Black is [0,1,0], and Blonde is [0,0,1].

For approval likelihood, using a one hot encoded vector for categorical inputs works well into a standard logistic regression. The depth and width of the network will depend upon the complexity of the input. In one embodiment, the initial network layer requires at least as many nodes as inputs, and there is no need for more than 3 layers to get acceptable learning rates in all cases.

As disclosed, mapping time to approval can be a more complicated network. This is not a linear regression problem because the relationship to attributes will not be linear. The real trend line will look more like a step function as attributes will trigger a new approval node once they exceed a rule specified value, adding in a new step in approval.

Therefore, a non-linear network is used to model. The width of the network should be as big as the list of attributes.

In embodiments, for predicting likelihood of approval, a history of failed approvals first needs to be stored. From the history of failed and successful quotes, embodiments can learn what quotes are most likely to get approved and then provide a predictor on a quote for how likely it is to be approved. Users can use this value to get insight into what they should do to the quote to make approval more likely.

Embodiments also are able to make a recommendation for what attributes could be changed to make the approval most likely to get approval.

In embodiments for approval likelihood, the neural network is a standard binary network. Because win rate quotes can be mapped to either a win or a loss, so too can an approval action map to either an approve or reject. Embodiments use a logistic regression where the input is the set of attributes on the quote at the time when the approve or reject took place.

Embodiments receive historical data for both approved and rejected quote and that data undergoes a process of preparation before they can be fed into the learning network. Next, this input is fed into the logistic regression.

Figure 7A:
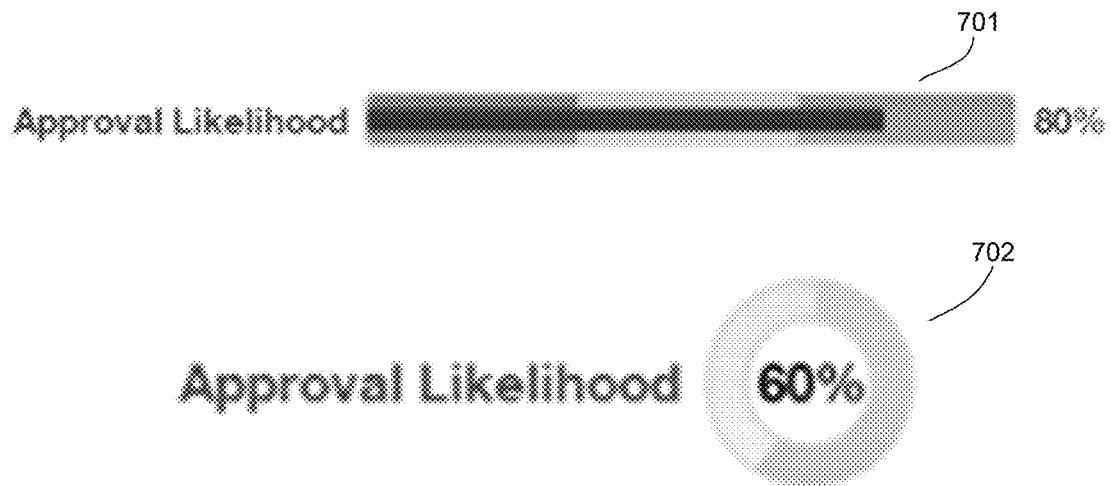
FIG. 7A illustrates example graphical user interfaces that provide the output of approval likelihood to the user in accordance to embodiments.

FIG. 7A illustrates example graphical user interfaces that provide the output of approval likelihood to the user in accordance to embodiments. The output may be provided as a bar gauge 701 or a circular gauge 702, and may be implemented using a JET UI.

Embodiments also maintain the length of time for an approval from the workflow. This data can be used to measure the time that it took for approved quotes to go from submitting the approval to the approval getting completed. With this data, embodiments learn how long a quote is expected to be in approval based upon the current quote's attributes. The approval time can be broken down to show the time to approve on every step in the approval.

Time approval prediction is also a machine learning system. The input variables are attributes on the quote and the output will be a single numeric value which will be the anticipated time the approval will take. For training, embodiments consume variables of approved quotes for input and the time taken to go through the submitted step to the finalized step in the workflow table. Previous rejections can be ignored. It is assumed that no changes were made to the quote after the quote was approved. Only the data showing the approval time need to be pulled from the historical record with the approval system and pre-processed before they are fed into the machine learning network in embodiments.

In embodiments, the data model for determining the approval time is a linear regression model. Embodiments create a linear model mapping all quote attributes into the model. They will be mapped to the approvals time from the above query.

Figure 7B:
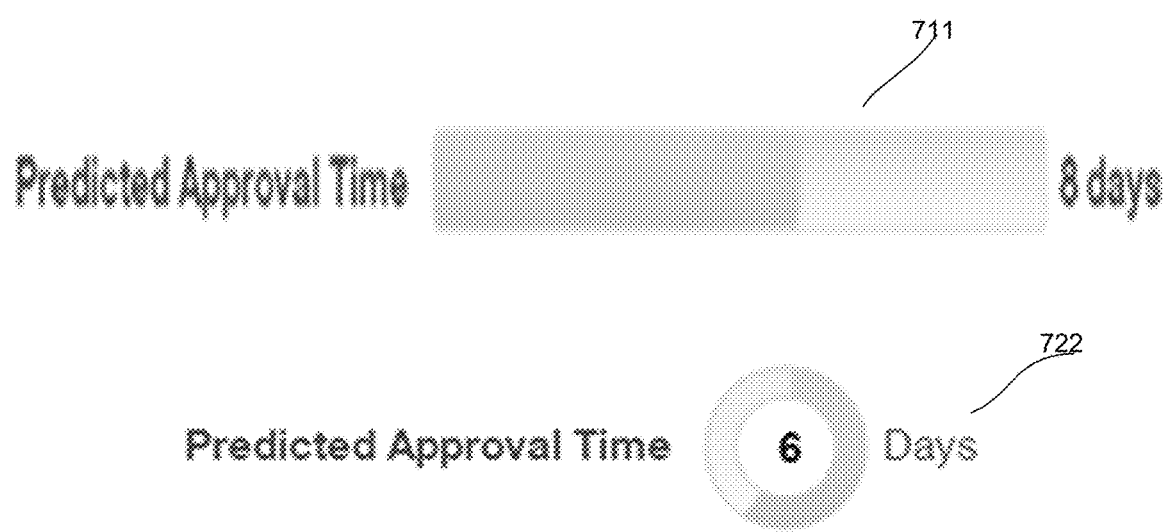
FIG. 7B illustrates example graphical user interfaces that provide the output of predicted approval time to the user in accordance to embodiments.

FIG. 7B illustrates example graphical user interfaces that provide the output of predicted approval time to the user in accordance to embodiments. The output may be provided as a bar gauge 711 or a circular gauge 722, and may be implemented using a JET UI.

Figure 8:
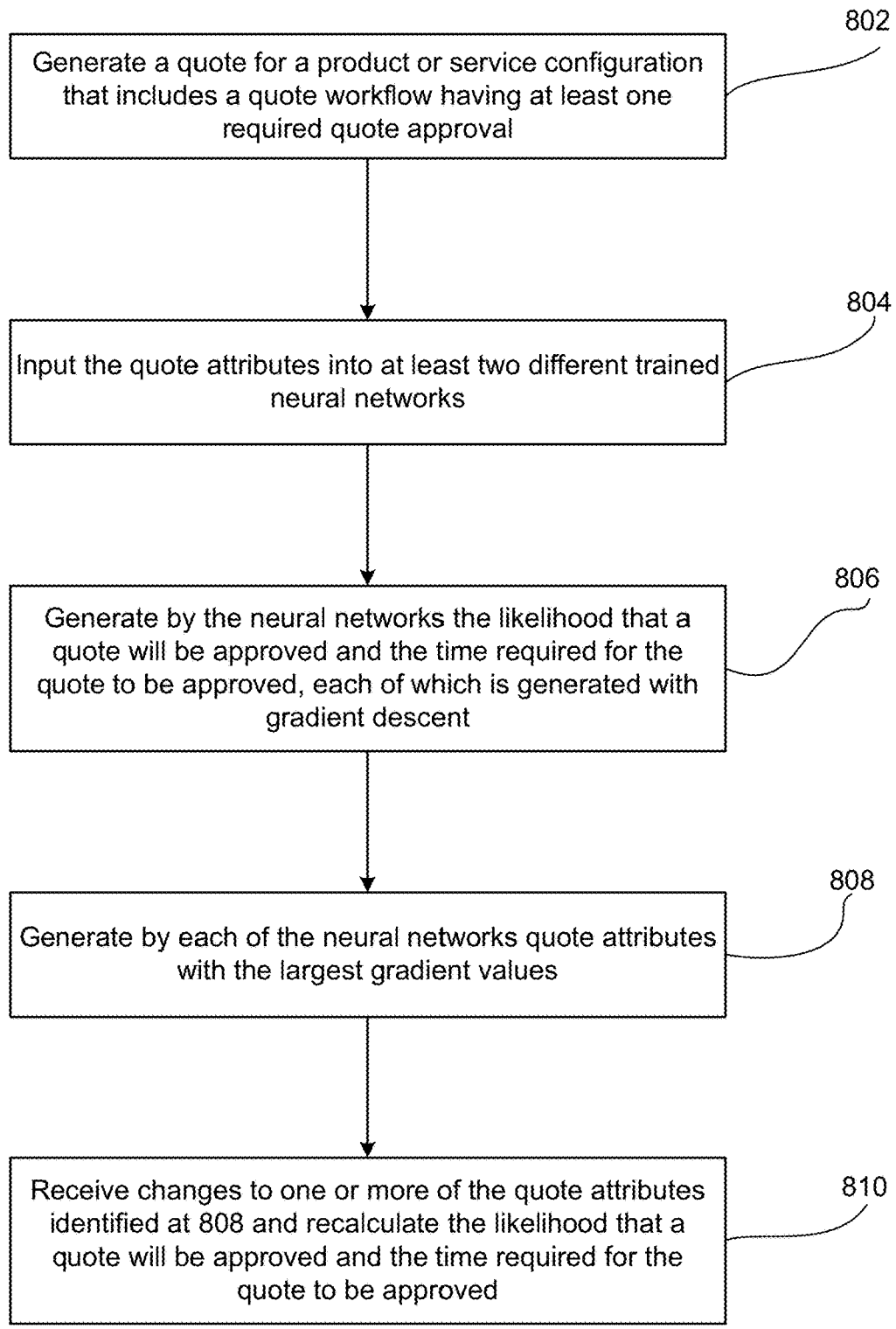
FIG. 8 is a flow diagram of the high level functionality of the quote approval module of FIG. 1 when providing enhanced quote approval functionality for a CPQ in accordance with one embodiment.

FIG. 8 is a flow diagram of the high level functionality of quote approval module 16 of FIG. 1 when providing enhanced quote approval functionality for a CPQ in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 802, a configurator generates a quote for a product or service configuration. The quote is generated through user interaction with the configurator and includes a quote workflow that includes at least one required quote approval. The quote also includes a plurality of quote attributes that define the quote.

At 804, the quote attributes are input to at least two different trained neural networks (i.e., neural network models). One of the neural network has been trained using past quotes and attributes and is configured to predict the likelihood that a quote will be approved. One of the neural network has been trained using past quotes and attributes and is configured to predict the time required for the quote to be approved.

At 806, the neural networks generate the likelihood that a quote will be approved and the time required for the quote to be approved, each of which is generated with gradient descent.

At 808, each of the neural networks generate the attributes with the largest gradient values to identify those attributes that can be modified to substantially change either the likelihood that a quote will be approved or the time required for the quote to be approved.

At 810, one or more of the identified attributes at 808 are changed and the likelihood that a quote will be approved and/or the time required for the quote to be approved are recalculated.

As disclosed, embodiments include a configuration or CPQ system that is enhanced to provide to the user prediction on the likelihood that a quote will be approved and the time required for the quote to be approved based on machine learning and neural networks. Further, embodiments provide one or more attributes having a high gradience to inform that user that changing those attributes will have large impact on the predictions.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of operating a configurator comprising:
generating a quote for a product or service configuration, the quote comprising a quote workflow that includes at least one required approval of the quote before the quote can be issued and the product or service configuration is offered for sale in a form of the quote, the quote comprising a plurality of quote attributes that define the quote and are provided as input to determine the at least one required approval;
receiving a historical set of quote attributes corresponding to a plurality of previous quotes and comprising a corresponding determination of whether each of the previous quotes was approved and/or a time taken to approve each of the previous quotes;
using the historical set of quote attributes to train a first neural network model and a second neural network model;
inputting the plurality of quote attributes into the first neural network model and a second neural network model;

generating at the first neural network model with a gradient descent a likelihood that the quote will be approved and at the second neural network model with the gradient descent a time required for the quote to be approved, wherein the gradient descent iteratively calculates the gradient of a loss function at each neuron and moves coefficient weights for each input attribute in a direction of a smaller loss;

generating one or more attributes with the largest gradient values for the likelihood that the quote will be approved and the time required for the quote to be approved;

based on the gradient values, displaying an indication of changes to be made to the quote to optimize an approval length; and in response to the display, receiving a change to one or more of the attributes and regenerating the likelihood that the quote will be approved and/or the time required for the quote to be approved based on the change.

2. The method of claim 1, wherein quote approvals of the quote comprise a graph of nodes.

3. The method of claim 1, wherein the quote attributes comprise at least one categorical attribute and at least one numeric attribute.

4. The method of claim 1, wherein the first neural network model comprises three layers, wherein two of the layers comprise linear neurons and a final layer comprises a sigmoid activation function.

5. The method of claim 4, wherein the first neural network model comprises $f(x)=1/(1+e^{\wedge}(Mx))$ having a gradient comprising $f'(x)=f(x)*(1-f(x))*M$, wherein "f" is a function, and "M" and "x" are vectors and "e" is a mathematical constant.

6. The method of claim 1, wherein the second neural network model comprises three layers having a first input layer comprising non-linear components and a second and third layer comprising linear components.

7. The method of claim 3, wherein the at least one numeric attribute is normalized to be between 0 and 1 and the at least one categorical attribute is transformed into one hot encoded vectors.

8. A non-transitory computer readable medium having instructions stored thereon that, when executed by a processor, cause the processor to operate a configurator, the operating comprising:

generating a quote for a product or service configuration, the quote comprising a quote workflow that includes at least one required approval of the quote before the quote can be issued and the product or service configuration is offered for sale in a form of the quote, the quote comprising a plurality of quote attributes that define the quote and are provided as input to determine the at least one required approval;

receiving a historical set of quote attributes corresponding to a plurality of previous quotes and comprising a corresponding determination of whether each of the previous quotes was approved and/or a time taken to approve each of the previous quotes;

using the historical set of quote attributes to train a first neural network model and a second neural network model;

inputting the plurality of quote attributes into the first neural network model and a second neural network model;

generating at the first neural network model with a gradient descent a likelihood that the quote will be approved and at the second neural network model with the gradient descent a time required for the quote to be approved, wherein the gradient descent iteratively calculates the gradient of a loss function at each neuron and moves coefficient weights for each input attribute in a direction of a smaller loss;

generating one or more attributes with the largest gradient values for the likelihood that the quote will be approved and the time required for the quote to be approved;

based on the gradient values, displaying an indication of changes to be made to the quote to optimize an approval length; and in response to the display, receiving a change to one or more of the attributes and regenerating the likelihood that the quote will be approved and/or the time required for the quote to be approved based on the change.

9. The non-transitory computer readable medium of claim 8, wherein quote approvals of the quote comprise a graph of nodes.

10. The non-transitory computer readable medium of claim 8, wherein the quote attributes comprise at least one categorical attribute and at least one numeric attribute.

11. The non-transitory computer readable medium of claim 8, wherein the first neural network model comprises three layers, wherein two of the layers comprise linear neurons and a final layer comprises a sigmoid activation function.

12. The non-transitory computer readable medium of claim 11, wherein the first neural network model comprises $f(x)=1/(1+e^{\wedge}(Mx))$ having a gradient comprising $f'(x)=f(x)*(1-f(x))*M$, wherein "f" is a function, "M" and "x" are vectors and "e" is a mathematical constant.

13. The non-transitory computer readable medium of claim 8, wherein the second neural network model comprises three layers having a first input layer comprising non-linear components and a second and third layer comprising linear components.

14. The non-transitory computer readable medium of claim 10, wherein the at least one numeric attribute is normalized to be between 0 and 1 and the at least one categorical attribute is transformed into one hot encoded vectors.

15. A product configurator comprising:
a first neural network model;
a second neural network model; and
one or more processors configured to:
generate a quote for a product or service configuration, the quote comprising a quote workflow that includes at least one required approval of the quote before the quote can be issued and the product or service configuration is offered for sale in a form of the quote, the quote comprising a plurality of quote attributes that define the quote and are provided as input to determine the at least one required approval;

receive a historical set of quote attributes corresponding to a plurality of previous quotes and comprising a corresponding determination of whether each of the previous quotes was approved and/or a time taken to approve each of the previous quotes;

use the historical set of quote attributes to train the first neural network model and the second neural network model;

input the plurality of quote attributes into the first neural network model and the second neural network model;

generate at the first neural network model with a gradient descent a likelihood that the quote will be approved and at the second neural network model with the gradient descent a time required for the quote to be approved, wherein the gradient descent iteratively calculates the gradient of a loss function at each neuron and moves coefficient weights for each input attribute in a direction of a smaller loss;

generate one or more attributes with the largest gradient values for the likelihood that the quote will be approved and the time required for the quote to be approved;

based on the gradient values, display an indication of changes to be made to the quote to optimize an approval length; and in response to the display, receive a change to one or more of the attributes and regenerating the likelihood that the quote will be approved and/or the time required for the quote to be approved based on the change.

16. The product configurator of claim 15, wherein the quote attributes comprise at least one categorical attribute and at least one numeric attribute.

17. The product configurator of claim 15, wherein the first neural network model comprises three layers, wherein two of the layers comprise linear neurons and a final layer comprises a sigmoid activation function.

18. The product configurator of claim 17, wherein the first neural network model comprises $f(x)=1/(1+e^{(Mx)})$ having a gradient comprising $f'(x)=f(x)*(1-f(x))*M$, wherein "f" is a function, and "M" and "x" are vectors and "e" is a mathematical constant.

19. The product configurator of claim 15, wherein the second neural network model comprises three layers having a first input layer comprising non-linear components and a second and third layer comprising linear components.

20. The product configurator of claim 16, wherein the at least one numeric attribute is normalized to be between 0 and 1 and the at least one categorical attribute is transformed into one hot encoded vectors.

* * * * *

UNITED STATES PATENT AND TRADEMARK OFFICE
CERTIFICATE OF CORRECTION

| | |
|---|---|
| PATENT NO. | : 11,615,289 B2 |
| APPLICATION NO. | : 16/021245 |
| DATED | : March 28, 2023 |
| INVENTOR(S) | : Wilkins et al. |

It is certified that error appears in the above-identified patent and that said Letters Patent is hereby corrected as shown below:

In the Specification

In Column 4, Line 31, delete "soft are" and insert -- software --, therefor.

In Column 10, Line 28, delete "approved," and insert -- approved. --, therefor.

In Column 10, Line 43, delete "0," and insert -- 0. --, therefor.

In Columns 11-12, Line 41, delete "4" and insert -- 1 --, therefor.

In Column 13, Line 2, delete "40," and insert -- 40. --, therefor.

Signed and Sealed this
Thirteenth Day of February, 2024

Katherine Kelly Vidal
*Director of the United States Patent and Trademark Office*